United States Patent
Yochai et al.

(10) Patent No.: US 10,430,087 B1
(45) Date of Patent: Oct. 1, 2019

(54) SHARED LAYERED PHYSICAL SPACE

(71) Applicant: Infinidat Ltd., Herzliya (IL)

(72) Inventors: Yechiel Yochai, Moshav Aviel (IL); Mike Dorfman, Herzliya (IL); Sivan Tal, Yifat (IL)

(73) Assignee: INFINIDAT LTD., Herzliya (IL)

( * ) Notice: Subject to any disclaimer, the term of this patent is extended or adjusted under 35 U.S.C. 154(b) by 243 days.

(21) Appl. No.: 15/421,449

(22) Filed: Feb. 1, 2017

(51) Int. Cl.
  *G06F 12/00* (2006.01)
  *G06F 3/06* (2006.01)
  *G06F 12/10* (2016.01)

(52) U.S. Cl.
  CPC .......... *G06F 3/0613* (2013.01); *G06F 3/0631* (2013.01); *G06F 3/0641* (2013.01); *G06F 3/0647* (2013.01); *G06F 3/0688* (2013.01); *G06F 12/10* (2013.01)

(58) Field of Classification Search
  CPC .................................................. G06F 3/0631
  See application file for complete search history.

(56) References Cited

U.S. PATENT DOCUMENTS

| | | | | |
|---|---|---|---|---|
| 5,829,046 A | * | 10/1998 | Tzelnic | G06F 12/0866 711/162 |
| 6,996,615 B1 | * | 2/2006 | McGuire | G06F 9/505 709/224 |
| 2008/0086620 A1 | * | 4/2008 | Morris | G06F 12/0284 711/203 |

\* cited by examiner

*Primary Examiner* — Baboucarr Faal
(74) *Attorney, Agent, or Firm* — Reches Patents (57) ABSTRACT

A method for managing write requests in a storage system, the method may include receiving, by a receiving control node out of a group of control nodes of the storage system, a write request for writing a data unit to the storage system; storing the data unit in a first layer storage that is shared among the control nodes of the group, by the receiving control node; retrieving the data unit from the first layer storage and destaging the data unit to a second layer storage by a destaging control node that belongs to the group and is responsible for destaging the data unit; wherein at a time of the destaging of the data unit to the second layer storage another control node of the group is responsible for destaging another data unit to the second layer storage; wherein the storing of the data unit in the first layer storage is faster than the destaging of the data unit to the second layer storage; and when the destaging control node differs from the receiving control node then each one of the receiving and the storing is not preceded by notifying the destaging control node about the receiving and the storing, respectively.

17 Claims, 4 Drawing Sheets

SHARED LAYERED PHYSICAL SPACE

BACKGROUND

Storage systems may receive write requests from one or more host computers. The storage system may respond to the write request by storing one or more data units in a permanent storage layer and then notify the host computer that sent the data request that the data unit was properly stored.

There is a growing need to allow storage systems to manage a large number of write requests in a fast and efficient manner.

SUMMARY

There may be provided a method for managing write requests in a storage system, the method may include receiving, by a receiving control node out of a group of control nodes of the storage system, a write request for writing a data unit to the storage system; storing the data unit in a first layer storage that may be shared among the control nodes of the group, by the receiving control node; retrieving the data unit from the first layer storage and destaging the data unit to a second layer storage by a destaging control node that belongs to the group and may be responsible for destaging the data unit; wherein at a time of the destaging of the data unit to the second layer storage another control node of the group may be responsible for destaging another data unit to the second layer storage; wherein the storing of the data unit in the first layer storage may be faster than the destaging of the data unit to the second layer storage; and wherein when the destaging control node differs from the receiving control node then each one of the receiving and the storing may be not preceded by notifying the destaging control node about the receiving and the storing, respectively.

The method may include selecting the destaging control node out of the group based on a virtual address associated with the write request.

The method may include dynamically changing a mapping between virtual address ranges and destaging control nodes responsible to destage data units associated with the virtual address ranges.

The method may include selecting the destaging control node out of the group based on a load balancing criterion.

The method may include notifying the destaging control node about a storing of a set of data units in the first layer storage after accumulating the set of data units; wherein the data unit belongs to the set of data units; wherein the set of data units may include a predefined number of data units that may be allocated for destaging by the destaging control node.

The destaging of the data unit may be included in a destaging of the set of data units.

The set of data units may be stored in a first layer storage segment; wherein the notifying about the storing of the set of data units occurs before the first layer storage segment may be full.

The set of data units may be stored in a first layer storage segment; wherein the notifying about the storing of the set of data units occurs when the first layer storage segment may be full.

The method may include performing, by the destaging control node at least one operation out of compressing the set of data units, deduplicating data units of the set of data units, and classifying data units to be stored together in the second layer storage.

The method may include storing the data unit in a first layer storage segment that may be allocated to the destaging control node.

The method may include storing the data unit in a first layer storage segment that may be allocated to a combination of the receiving control node and the destaging control node.

The first and second layer storages may be nonvolatile storages.

The first layer storage has a shorter access time than the second layer storage.

The destaging of the data unit to the second layer storage may be preceded by selecting the second layer storage out of multiple second layer storages.

The at least two of the multiple second layer storages may differ from each other.

There may be provided a computer program product that stores instructions for managing write requests in a storage system, the instructions, once executed by a storage system causes the storage system to execute the steps of: receiving, by a receiving control node out of a group of control nodes of the storage system, a write request for writing a data unit to the storage system; storing the data unit in a first layer storage that may be shared among the control nodes of the group, by the receiving control node; retrieving the data unit from the first layer storage and destaging the data unit to a second layer storage by a destaging control node that belongs to the group and may be responsible for destaging the data unit; wherein at a time of the destaging of the data unit to the second layer storage another control node of the group may be responsible for destaging another data unit to the second layer storage; wherein the storing of the data unit in the first layer storage may be faster than the destaging of the data unit to the second layer storage; and wherein when the destaging control node differs from the receiving control node then each one of the receiving and the storing may be not preceded by notifying the destaging control node about the receiving and the storing, respectively.

There may be provided a storage system that may include a first layer storage, a second layer storage and a group of control nodes; wherein the wherein the first layer storage may be shared among the control nodes of the group; wherein a receiving control node of the group may be configured to receive a write request for writing a data unit to the storage system, and to store the data unit in the first layer storage; wherein a destaging control node of the group may be configured to retrieve the data unit from the first layer storage and destaging the data unit to the second layer storage; wherein the destaging control node may be responsible for destaging the data unit; wherein at a time of the destaging of the data unit to the second layer storage another control node of the group may be responsible for destaging another data unit to the second layer storage; wherein the storing of the data unit in the first layer storage may be faster than the destaging of the data unit to the second layer storage; and wherein when the destaging control node differs from the receiving control node then the receiving control node avoids from notifying the destaging control node about the receiving and the storing before each one of the receiving and the storing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a computer program product that stores instructions that once executed by a computer result in the execution of the method.

Any reference in the specification to a system should be applied mutatis mutandis to a method that may be executed by the system and should be applied mutatis mutandis to a computer program product that stores instructions that may be executed by the system.

Any reference in the specification to a computer program product should be applied mutatis mutandis to a system capable of executing the instructions stored in the computer program product and should be applied mutatis mutandis to method that may be executed by a computer that reads the instructions stored in the non-transitory computer readable medium.

A storage system can be based on a cluster of connected control nodes (controllers) for achieving high availability. The main cluster configurations are active-active and active-passive. A control node may be a computer, a server, multiple processing cards, one or more hardware processors, and the like. A control node may be capable of managing various operations related to the storage system such as storing and destaging.

A control node is referred to as a receiving control node, with regard to a specific write request, when it receives the write request. Different control nodes can be regarded as receiving control nodes with regard to different write requests received by these control nodes.

A control node is referred to as a destaging control node, with regard to a specific data unit, when it is responsible for destaging the data unit.

An active-active cluster is typically made up of at least two nodes, both actively running and processing access requests simultaneously. In addition to protection and resiliency, an active-active cluster is used to achieve load balancing for distributing workloads across all nodes, in order to prevent any single node from getting overloaded.

Assuming that any host that uses the storage system is configured to access all the nodes, so that traffic from a single host is expected to be received at any node, and assuming that there is no external load balancer between the hosts and the storage cluster, then the nodes themselves need to balance I/O requests received from the hosts, by redirecting received I/O requests from a receiving node to another node that is defined as the node responsible to process the specific traffic, according to predefined balancing rules.

Redirecting traffic of write requests that include data to be written imposes heavy traffic on the internal communication lines that connect the cluster nodes. Furthermore, a write request is not acknowledged to the host until being saved by the node responsible for processing the write request, which may be different from the receiving node. Transmitting the write request over the internal communication lines, which may be loaded with traffic communicated between receiving nodes to other nodes, further increases the latency of I/O requests measured by the hosts.

There may be provided computer program products, storage systems and methods for efficiently and quickly sharing the workload of handling write requests among multiple control nodes (e.g., servers, controllers, or any kind of computerized device) within a cluster of nodes of the storage system.

Each control node is responsible for processing access requests directed to a portion of a virtual storage space. The virtual storage space is composed of virtual addresses that are exposed to the hosts and serves as the target for write requests received from hosts coupled to the storage system.

A control node is referred to as a primary control node (or destaging control node) with regard to a certain virtual address range if the certain virtual address range is defined as being under the responsibility of that control node (especially when the control node is responsible for destaging data units associated with virtual addresses within the certain virtual address range).

Any control node can receive from the hosts write requests that are addressed to any ranges within the virtual storage space, regardless of the identity of the primary node responsible to these addresses.

According to embodiments of the present invention, the receiving control node, i.e., the control node that received a write request directed to a certain virtual address range, and the primary node of the certain virtual address range—both participate in the process of storing the data units directed to the certain virtual address range, wherein the receiving control node performs fast initial operations, that after being performed can be acknowledged to the host, while the primary control node performs time and resource consuming operations, where load balancing is more important. The role of the receiving control node is executing the initial storing of the data units to a first layer storage, which is a shared storage (accessible to all control nodes) even if the receiving control node is not defined as the primary control node for the certain virtual address range of the data units.

The initial storing to a shared storage by the receiving control node spares communication between the receiving control node and the primary control node for transferring the data of the write requests and therefore minimizes traffic among the control nodes.

The first layer storage may be a non-volatile fast access storage and therefore at this stage the host can be promptly acknowledged on the processing of the write request. Any further processing with regard to the newly stored data, and particularly, more complex and time consuming processing (that requires load balancing), can be performed later by the primary control node.

Thus, while the initial storing is under the responsibility of the receiving control node, the primary control node is responsible for destaging data from the first layer storage into a second layer storage. The second layer storage may be a slower storage, so the destaging may be a time-consuming process, but is executed as a background process. The primary control node may also be responsible for address mapping: mapping virtual addresses into physical addresses within the first layer storage—after storing by the receiving control node, and mapping the virtual addresses into physical addresses within the second layer storage—upon being destaged by the primary control node.

Figure 1:
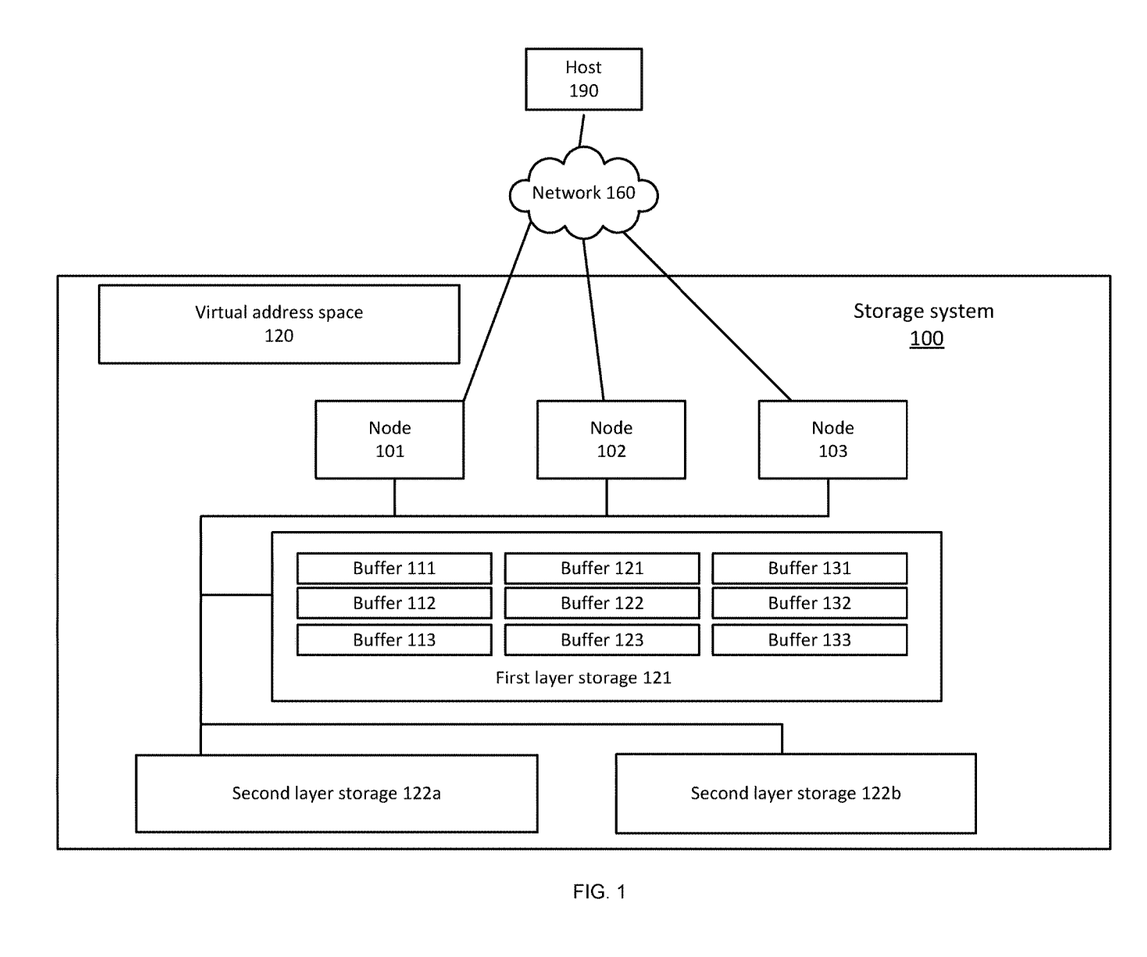
FIG. 1 illustrates an example of a storage system, a network and host computers.

In FIG. 1 it is assumed that the destaging responsibility is allocated per virtual memory address ranges. This is an example and other allocations may be applied.

FIG. 1 illustrates a storage system 100 that includes a cluster of three control nodes, such as control nodes 101, 102 and 103. The storage system provides access to a virtual storage space 120 that may be composed of logical volumes (not shown) or any other virtual storage entities.

Virtual addresses within virtual storage space 120 are accessed by hosts computers coupled to storage system 100 via a network 160 and being addressed in write requests received from the host computers.

The address space of virtual storage space 120 is divided among control nodes 101, 102, 103, so that each control node is a primary node of a different third of virtual storage space 120. Uneven partitions may be applied.

Virtual storage space 120 can be divided to three or more virtual units (VUs). For example, virtual storage space 120 may be divided to six VUs and each node is regarded as a primary node of two of the VUs, if all three nodes are operational. If one node is not operational, then each of the two other nodes will be responsible for three VUs.

Any virtual address range within virtual storage space 120 can be correlated to one VU and the primary node that is responsible for the virtual address range can be concluded from the VU. For example, suppose there are N data units in virtual storage space 120, each data unit is of 64 KB. A modulo (6, in case of six VUs) can be calculated on the index 1-N (or offset or any other identifier of the data unit) of the data unit within virtual storage space, so as to identify the VU that owns the data unit. The address space within virtual storage space 120 can be divided to logical volumes and a modulo (6, in case of six VUs) can be calculated on the index (or offset or any other identifier of the data unit) of the data unit among data units of a logical volume, so as to identify the VU that owns the data unit.

According to embodiments of the present invention, when a control node receives (a receiving node) a write request for storing data from a host computer 190, it stores the data in a first layer storage 121, regardless of the identity of the primary node responsible for the address range indicated in the write request.

First layer storage 121 is a shared non-volatile memory that is accessible to all nodes and may be a fast access SSD. First layer storage 121 may be considered as a temporary storage space of data, before the data is being destaged to a second layer storage, but may also be a permanent storage space for certain types of data that is not to be destaged to a secondary storage space.

The second layer storage space may include one or more storage spaces, for example second layer storage 122a and 122b, which may be cheaper and slower than first layer storage 121. Different second layer storages may differ from each other by their capacity, speed, and price. For example, second layer storage 122a may be, for example a slow SSD (slower but cheaper than first layer storage 121), while second layer storage 122b may be composed of hard disk drives (which are slower but cheaper than second layer storage 122a).

According to an embodiment of the present invention, each node utilizes a buffer of successive addresses within first layer storage 121 for storing multiple data units that belongs to a certain VU (or—are under the responsibility of a certain primary node). The multiple data units may be data accumulated from multiple write requests, wherein each write request includes data and virtual address range (or start virtual address and size) of one or more data units. FIG. 1 illustrates six buffers: Buffer 111 is used for storing and accumulating data units that were received by control node 101 and belong to a VU that is under the responsibility of control node 102; Buffer 112 is used for storing and accumulating data units that were received by control node 101 and belong to a VU that is under the responsibility of control node 103; Buffer 113 is used for storing and accumulating data units that were received by control node 101 and belong to a VU that is under the responsibility of control node 101 (the receiving node is also the primary node for these data units). Similarly, buffers 121, 122 and 123 are used for storing and accumulating data units that were received by control node 102, wherein each buffer stores data units that are under the responsibility of a different node of the three nodes. Similarly, buffers 131, 132 and 133 used for storing and accumulating data units that were received by control node 103.

The receiving node may notify the primary node when the buffer is full. For example, when buffer 111 is full (and includes multiple data units from multiple write requests) control node 101 will notify control node 102, which is the primary node with regard to the data in buffer 111.

The primary node can now decide whether to destage the data units and may choose the second layer storage that will be the target of the destage, or may decide to maintain the data units in the first layer storage.

Since the buffer includes a bulk of data, the primary node can activate algorithms that go along with destaging and work better when applied to a large amount of accumulated data, such as de-duplicating and compression, destaging the data according to various classifications of the data, e.g., hot/cold classification, accumulate data units having successive virtual addresses, or other algorithms to be performed upon destaging.

Figure 2:
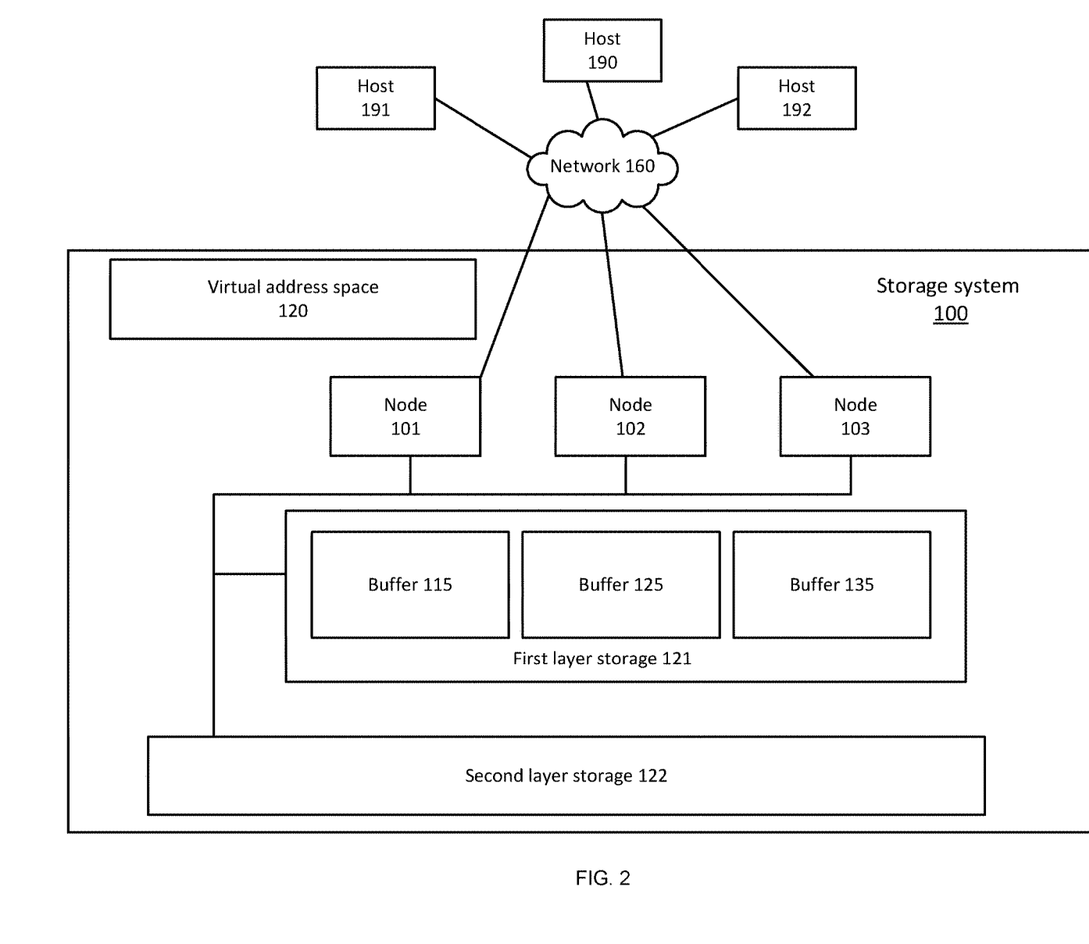
FIG. 2 illustrates an example of a storage system, a network and host computers.

FIG. 2 illustrates another example of storage system 110.

FIG. 2 illustrates multiple host computers 190, 191 and 192 that may be coupled via the network to storage system 100. The number of hosts computers that are coupled to each one of the storage systems of FIGS. 1 and 2 may range between 1 and a large number of host computers.

In FIG. 2 there is a single second layer storage 122 and there is a buffer per destaging control node—buffer 115 for storing data units to be destaged by control node 102, buffer 125 for data units to be destaged by control node 103 and buffer 135 for storing data units to be destaged by control node 101.

Figure 3:
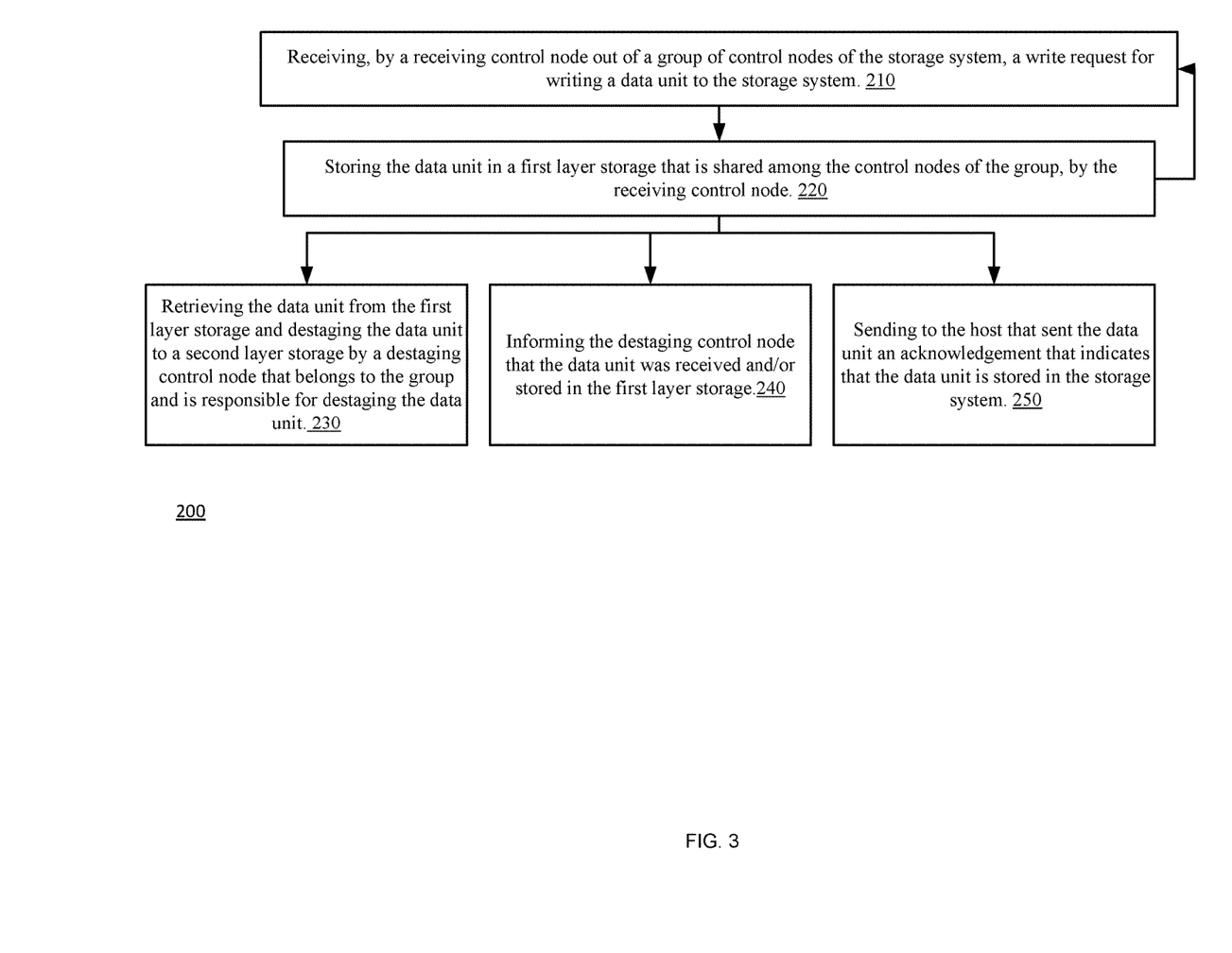
FIG. 3 illustrates an example of a method.

FIG. 3 illustrates method 200 according to an embodiment of the invention.

Method 200 starts by step 210 of receiving, by a receiving control node out of a group of control nodes of the storage system, a write request for writing a data unit to the storage system.

Step 210 may be followed by step 220 of storing the data unit in a first layer storage that is shared among the control nodes of the group, by the receiving control node.

Step 220 may be followed by either one of steps 210, 230, 240 and 250.

Step 220 is followed by step 210—so that the receiving control node may receive another data unit.

Step 230 may include retrieving the data unit from the first layer storage and destaging the data unit to a second layer storage by a destaging control node that belongs to the group and is responsible for destaging the data unit.

The receiving control node is a part of a group of control nodes that may distribute the responsibility for destaging data units between them. For example—data units that belong to different virtual address ranges may be allocated to different control nodes of the group. Yet for another example—the allocation of responsibility may be a function of the current and/or previous load of the storage system. For example—the storage system may determine that a certain control node that is less busy than the other control nodes of the group will manage more destaging operations. The allocation of the destage responsibility may be determined by the control nodes, by a separate controller, may be fixed, may be dynamically changed, and the like.

Due to the distribution of the destaging responsibility among the control nodes—at the time of the destaging of the data unit to the second layer storage another control node of the group is responsible for destaging another data unit to the second layer storage.

Due to the distribution of the destaging responsibility among the control nodes-method 200 may include selecting the destaging control node out of the group based on a virtual address associated with the write request. For example—a virtual memory space (such as virtual address space 120) that is associated with the storage system may be divided to different virtual memory ranges in an even and/or uneven manner—and different control nodes may be responsible for destaging data units that belong to different virtual memory ranges. Yet for another example—the method may include selecting the destaging control node out of the group based on a load balancing criterion.

The selection of the destaging control node can be executed once or multiple times during the lifespan of the storage system. The method may include dynamically changing the mapping between virtual address ranges and destaging control nodes responsible to destage data units associated with the virtual address ranges. Particularly, the mapping between virtual address ranges and destaging control nodes can be changed when one of the control nodes becomes non-operational and the other control nodes should take over the responsibilities of the non-operational node, for example, the remaining operational nodes can split among them the responsibility for the virtual address ranges that the non-operational node used to destage data units associated with these virtual address ranges.

The storing of the data unit in the first layer storage is faster (for example by a factor that may range between 2 and more than one thousand) than the destaging of the data unit to the second layer storage. This may be attributed to differences in the speed of the first layer storage and the second layer storage and/or to the difference between the type and/or amount of processing operations that are associated with the storing versus the destaging.

For example—the first layer storage may be a very fast storage (for example—a fast solid state drive SSD) that may have an access time of 10 microseconds. The second layer storage may be a slower SSD that may have an access time of 100-200 microseconds. Yet for another example—the second layer storage may be a rotational disk drive that has an access time of 10 milliseconds.

Step 230 may include executing one or more operations that may or may not be regarded as part of the destaging.

Step 240 may include informing the destaging control node (when the destaging control node differs from the receiving control node) that the data unit was received and/or stored in the first layer storage or that the data unit is ready for destaging.

Accordingly—when the destaging control node differs from the receiving control node then each one of the receiving 210 and the storing 220 is not preceded by notifying the destaging control node about the receiving and the storing, respectively. Particularly, the receiving control node does not need to send the data unit itself to the destaging control node. This speeds up the storing of the data unit and reduced traffic between the control nodes.

Step 250 may include sending to the host that sent the data unit (in the write request) an acknowledgement that indicates that the data unit is stored in the storage system. This reduces the delay between the reception of the data unit by the storage system and the transmission of acknowledgements—as there is no need to wait for the destaging of the data unit. This contributes to the efficiency of write requests and frees the host computer from waiting for the acknowledge. This may allow the host computer to send to the storage system more data units per time period.

In order to reduce the amount of communication between the different control nodes and/or the communication related to the receiving and/or the storing of data units then the control nodes may be notified of the reception and/or storage of sets of data units—and not notified on a single data unit basis.

A set of data units may include a predefined number of data units. Data units of a set of data units should be destaged by the same destage control node. The predefined number of data units may exceed 16, may exceed 200, and the like. The total amount of accumulated data in the buffer may exceed one megabyte, may exceed ten megabyte, and the like. The one or more operations of step 230 gets more efficient as the predefined number of data units of the set grows, since operations such as e.g., compression or deduplication are more efficient when applied to a large amount of data.

For Example—step 230 may include compressing the set of data units, deduplicating data units of the set of data units, and classifying data units to be stored together in the second layer storage, and the like.

The first layer storage may be virtually segmented to first layer storage segments. These first layer storage segments may be regarded as buffers. In FIG. 1 the buffers are allocated per a combination of receiving control node and destaging control node—but other allocations can be provided. For example—the allocation of buffers may be dependent on the destaging control node, as illustrated in FIG. 2 and not on the receiving control node.

In order to prevent buffer overflow the destaging control node may be notified about the storing of the set of data units occurs before the buffer is full. Alternatively, when the buffer is full, a notification is sent for transferring the control for the buffer to the destaging node, and another buffer may be allocated and associated with the destaging control node or with both destaging control node and receiving control node. New received data units that are destined for destaging by the destaging control node can be stored in the new buffer.

Although FIG. 2 illustrates a single second layer storage—there may be provide multiple second layer storages. Step 230 may include (or may be preceded by) selecting the second layer storage out of multiple second layer storages. Two of the multiple second layer storages differ from each other—for example by their access time or other performance characteristic, by their availability, by the cost of storage—and the selection may be responsive to this difference. The selection may be responsive to a service level agreement associated with the data unit, to a priority associated with the data unit, and the like. The selection may be responsive to both the performance characteristics of the second layer storages and the priority associated with the data unit.

Figure 4:
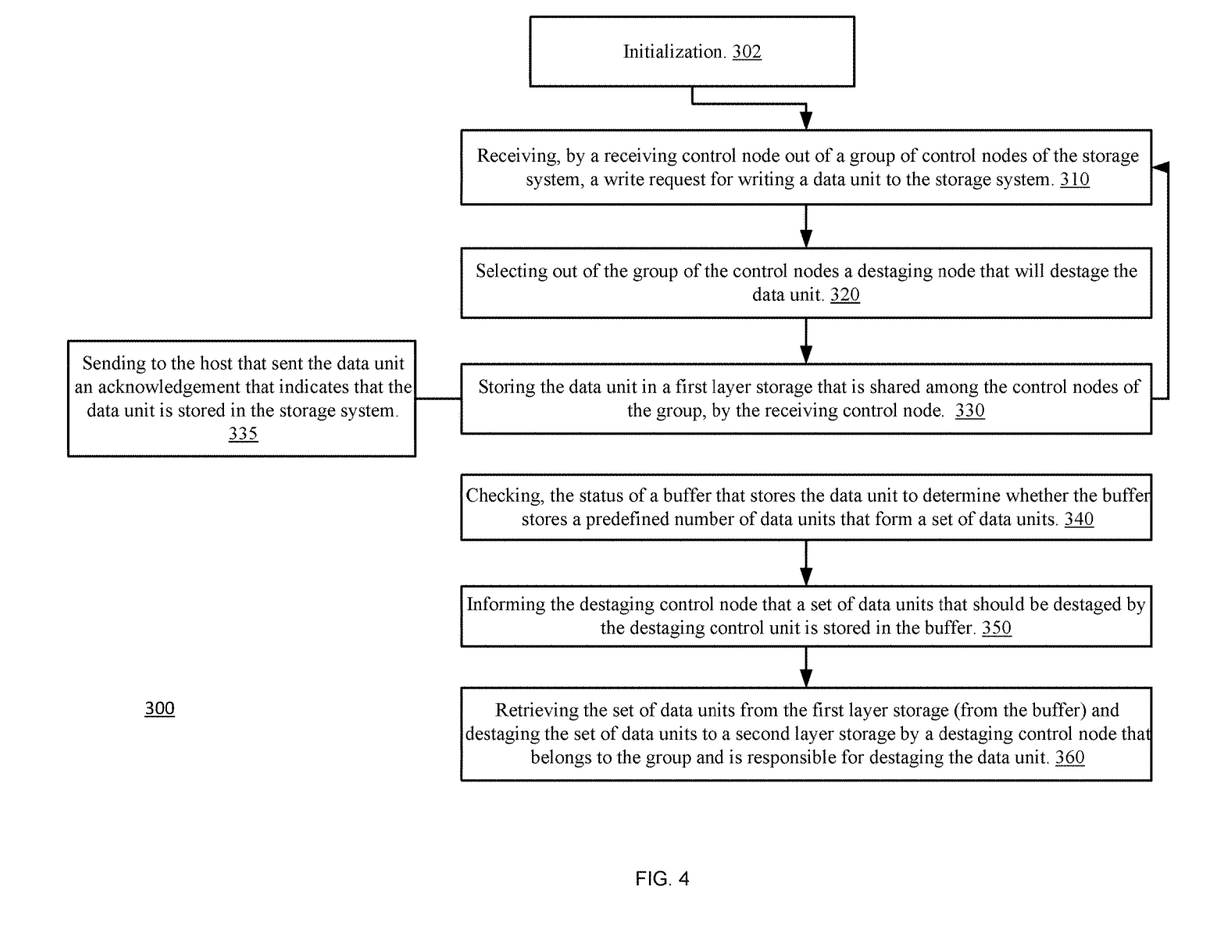
FIG. 4 illustrates an example of a method.

FIG. 4 is an example of method 300.

Method 300 may start by an initialization step 302 of determining the destaging responsibilities among the control nodes of a group of control nodes.

Step 302 may be followed by step 310 of receiving, by a receiving control node out of a group of control nodes of the storage system, a write request for writing a data unit to the storage system.

Step 310 may be followed by step 320 of selecting out of the group of the control nodes a destaging node that will destage the data unit. The selection can be based on the virtual address of the data unit and in view of the destaging responsibilities that were determined in step 302, but other selection rules may be applied.

Step 320 may be followed by step 330 of storing the data unit in a first layer storage that is shared among the control nodes of the group, by the receiving control node. The storing may be associated with the selected destaging control node. For example, the data units to be destaged by a certain destaging control node may be aggregated in a certain buffer that is associated with the certain destaging control node. Yet for another example—data units that were received by a given receiving control node and are destined to be destaged by the certain destaging control node may be stored in a certain buffer that is associated with the certain destaging control node and the given receiving control node.

Step 330 may be followed by either one of steps 310 and 335.

Step 330 is followed by step 310—so that the receiving control node may receive another data unit.

Step 335 may include sending to the host that sent the data unit an acknowledgement that indicates that the data unit is stored in the storage system.

Method 300 may include step 340 of checking, the status of a buffer that stores the data unit to determine whether the buffer stores a predefined number of data units that form a set of data units.

If the buffer stores the set of data units then step 340 may be followed by step 350 of informing the destaging control node that a set of data units that should be destaged by the destaging control unit is stored in the buffer.

Step 350 may be followed by step 360 of retrieving the set of data units from the first layer storage (from the buffer) and destaging the set of data units to a second layer storage by a destaging control node that belongs to the group and is responsible for destaging the data units of the set.

Step 360 may include executing one or more operations that may or may not be regarded as part of the destaging. These one or more operations may include compressing the set of data units, deduplicating data units of the set of data units, and classifying data units to be stored together in the second layer storage, and the like.

Accordingly—when the destaging control node differs from the receiving control node then each one of the receiving 310 and the storing 330 is not preceded by notifying the destaging control node about the receiving and the storing, respectively. This speeds up the storing of the data unit and reduced traffic between the control nodes.

The invention may also be implemented in a computer program for running on a computer system, at least including code portions for performing steps of a method when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer program product that is non-transitory. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

more, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. more, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for managing write requests in a storage system, the method comprises:
    determining destaging responsibilities of each control node of a group of control nodes of the storage system, wherein different control nodes are assigned with different destaging responsibilities;
    receiving, by a receiving control node out of the group of control nodes of the storage system, a write request for writing a data unit to the storage system;
    selecting a destaging control node of the group of control nodes, that is responsible for destaging the data unit, in view of the destaging responsibilities;
    storing the data unit in a first layer storage segment within a first layer storage, by the receiving control node, wherein the first layer storage is a shared memory accessible to the control nodes of the group, and wherein the first layer storage segment is configured for storing data units that are associated with the destaging responsibilities of the destaging control node;
    retrieving the data unit from the first layer storage segment and destaging the data unit to a second layer storage by the destaging control node; wherein at a time of the destaging of the data unit to the second layer storage another control node of the group is responsible for destaging another data unit to the second layer storage; wherein the storing of the data unit in the first layer storage is faster than the destaging of the data unit to the second layer storage; and
    wherein when the destaging control node differs from the receiving control node then each one of the receiving and the storing is not preceded by notifying the destaging control node about the receiving and the storing, respectively.

2. The method according to claim 1 comprising selecting the destaging control node out of the group based on a virtual address associated with the write request, wherein the destaging responsibilities of the destaging control node are associated with a virtual address range within the storage system that includes the virtual address associated with the write request.

3. The method according to claim 2 wherein the determining of the destaging responsibilities comprises dynamically changing a mapping between virtual address ranges and destaging control nodes responsible to destage data units associated with the virtual address ranges.

4. The method according to claim 1 comprising selecting the destaging control node out of the group based on a load balancing criterion.

5. The method according to claim 1 comprising notifying the destaging control node about a storing of a set of data units in the first layer storage segment after accumulating the set of data units; wherein the data unit belongs to the set of data units; wherein the set of data units comprises a predefined number of data units that are allocated for destaging by the destaging control node.

6. The method according to claim 5 wherein the destaging of the data unit is included in a destaging of the set of data units.

7. The method according to claim 5 wherein the notifying about the storing of the set of data units occurs before the first layer storage segment is full.

8. The method according to claim 5 wherein the notifying about the storing of the set of data units occurs when the first layer storage segment is full.

9. The method according to claim 5 further comprising performing, by the destaging control node at least one operation out of compressing the set of data units, deduplicating data units of the set of data units, and classifying data units to be stored together in the second layer storage.

10. The method according to claim 1 wherein the first layer storage segment is allocated to the destaging control node.

11. The method according to claim 1 wherein the first layer storage segment is allocated to a combination of the receiving control node and the destaging control node.

12. The method according to claim 1 wherein the first and second layer storages are nonvolatile storages.

13. The method according to claim 1 wherein the first layer storage has a shorter access time than the second layer storage.

14. The method according to claim 1 wherein the destaging of the data unit to the second layer storage is preceded by selecting the second layer storage out of multiple second layer storages.

15. The method according to claim 14 wherein different second layer storages of the multiple second layer storages have different performance characteristic, wherein the selecting of the second layer storage is based at least on the different performance characteristic.

16. A computer program product that stores instructions for managing write requests in a storage system, the instructions, once executed by a storage system causes the storage system to execute the steps of:
  determining destaging responsibilities of each control node of a group of control nodes of the storage system, wherein different control nodes are assigned with different destaging responsibilities;
  receiving, by a receiving control node out of the group of control nodes of the storage system, a write request for writing a data unit to the storage system;
  selecting a destaging control node of the group of control nodes, that is responsible for destaging the data unit, in view of the destaging responsibilities;
  storing the data unit in a first layer storage segment within a first layer storage, by the receiving control node, wherein the first layer storage is a shared memory accessible to the control nodes of the group, and wherein the first layer storage segment is configured for storing data units that are associated with the destaging responsibilities of the destaging control node;
  retrieving the data unit from the first layer storage segment and destaging the data unit to a second layer storage by the destaging control node; wherein at a time of the destaging of the data unit to the second layer storage another control node of the group is responsible for destaging another data unit to the second layer storage; wherein the storing of the data unit in the first layer storage is faster than the destaging of the data unit to the second layer storage; and
  wherein when the destaging control node differs from the receiving control node then each one of the receiving and the storing is not preceded by notifying the destaging control node about the receiving and the storing, respectively.

17. A storage system that comprises a first layer storage, a second layer storage and a group of control nodes; wherein the wherein the first layer storage is a shared memory accessible to the control nodes of the group;
  wherein the group of control nodes is configured to determine destaging responsibilities of each control node of the group, wherein different control nodes are assigned with different destaging responsibilities;
  wherein a receiving control node of the group is configured to: receive a write request for writing a data unit to the storage system; select a destaging control node of the group of control nodes, that is responsible for destaging the data unit, in view of the destaging responsibilities; and to store the data unit in a first layer storage segment within the first layer storage, wherein the first layer storage segment is configured for storing data units that are associated with the destaging responsibilities of the destaging control node;
  wherein the destaging control node is configured to retrieve the data unit from the first layer storage segment and to destage the data unit to the second layer storage;
  wherein at a time of the destaging of the data unit to the second layer storage another control node of the group is responsible for destaging another data unit to the second layer storage;
  wherein the storing of the data unit in the first layer storage is faster than the destaging of the data unit to the second layer storage; and
  wherein when the destaging control node differs from the receiving control node then the receiving control node avoids from notifying the destaging control node about the receiving and the storing before each one of the receiving and the storing.

* * * * *